United States Patent [19]
Blomberg

[11] 4,225,018
[45] Sep. 30, 1980

[54] SENSOR FOR BRAKING SYSTEMS

[76] Inventor: Folke I. Blomberg, Duvstigen 4, S-181, 40 Lidingo, Sweden

[21] Appl. No.: 952,962

[22] Filed: Oct. 20, 1978

Related U.S. Application Data

[63] Continuation-in-part of Ser. No. 657,104, Feb. 11, 1976, Pat. No. 4,061,212, and a continuation-in-part of Ser. No. 847,669, Nov. 1, 1977.

[30] Foreign Application Priority Data

Apr. 24, 1978 [SE] Sweden .............................. 7804675

[51] Int. Cl.³ .............................................. B60T 8/06
[52] U.S. Cl. .................................................. 188/181 R
[58] Field of Search ........... 188/181 A, 181 C, 181 R; 200/61.46; 303/22 R, 93, 95, 97, 113; 310/168

[56] References Cited

U.S. PATENT DOCUMENTS

| | | |
|---|---|---|
| 3,953,691 | 4/1976 | Grosseau ...................... 188/181 R X |
| 4,061,212 | 12/1977 | Blomberg ......................... 188/181 A |
| 4,063,052 | 12/1977 | Grosseau ........................... 200/61.46 |

Primary Examiner—Duane A. Reger
Attorney, Agent, or Firm—Bell, Seltzer, Park & Gibson

[57] ABSTRACT

A sensor for responding to the rate of change of changing rotational speeds of a rotating vehicle wheel and including a flyweight coupleable for rotation in response to wheel rotation and selectively decoupleable in response to the exertion on the flyweight of a torque having a magnitude greater than a threshold magnitude due to a change in rotational speed of the wheel. In accordance with the present invention, a control device is operatively connected with the flyweight for exerting on the flyweight torques resisting decoupled rotation of the flyweight and is operable for changing the level of torque from a first level to a second level. Provision is made for signalling of any occurrence of an excessive rate of change of rotational speed of the wheel, and the control mechanism is operable in response to such signalling for changing the level of torque and thereby for causing the sensor to signal continuously for the interval of time during which the threshold rate is exceeded.

31 Claims, 8 Drawing Figures

SENSOR FOR BRAKING SYSTEMS

This application is a continuation-in-part of earlier application Ser. No. 657,104 filed Feb. 11, 1976 and now U.S. Pat. No. 4,061,212 and of copending application Ser. No. 847,669 filed Nov. 1, 1977. Prior U.S. Pat. No. 4,061,212 is hereby incorporated by reference to any extent necessary to a full understanding of this application.

Technical Field and Background of the Invention

As is known to persons skilled in the art of braking rotating members such as automotive vehicle wheels, where brake modulators are used for varying the braking effect exerted, it is necessary to sense the rate of change of changing rotational speeds of a rotatable element. Other examples of such needs are known to persons skilled in the applicable arts. A variety of approaches to sensing rates of change of changing rotational speeds and/or vehicle wheel slip have been proposed heretofore, including certain prior sensors disclosed by the inventor of the sensor described hereinafter.

In connection with the development and use of sensors of the type briefly described hereinabove, one line of development has been directed to sensors having a flyweight coupleable for rotation in response to wheel rotation and selectively decoupleable in response to the exertion on the flyweight of a torque having a magnitude greater than a threshold magnitude due to change in rotation of a vehicle wheel. In such sensors, it has now become known to provide a control means operatively connected with a flyweight for exerting thereon torques resisting decoupled rotation of the flyweight and a signalling means such as an electrical switch, which may preferably be of a magnetically actuated type such as a reed switch or a Hall effect semiconductor switch, responsive to decoupled rotation of the flyweight for signalling occurrences of an excessive rate of change in changing rotational speeds of the wheel. Those forms of sensors which have achieved particular success in accommodating a wide range of vehicle operating conditions have done so, at least in part, by providing an improved control means capable of applying a torque which is an average of a plurality of different torques individually applied in a rapidly fluctuating series. Such sensors, while successful, may under certain operating circumstances and in certain systems require insertion of special electrical circuits or the use of other special components in order to accommodate generation of signals as a train of rapidly fluctuating pulses.

BRIEF SUMMARY OF THE INVENTION

With the above discussion in mind, it is an object of the present invention to accomplish proper operation of a sensor while simplifying certain characteristics of a system incorporating that sensor. In realizing this object of the present invention, a sensor of the general type described is improved by causing a signal to be emitted continuously for the interval of time during which the rate of change of changing rotational speeds of a vehicle wheel is excessive. By such continuous signalling, the necessity of providing special modulators or circuitry is reduced and alleviated.

Yet another object of the present invention is to accomplish more precise control over variations in the operating characteristics of a sensor. In realizing this object of the present invention, control means and provided and employed which open the possibility of more accurately controlling one or both of the levels of torque exerted on a flyweight.

BRIEF DESCRIPTION OF THE DRAWINGS

Some of the objects having been stated, other objects will appear as the description proceeds, when taken in connection with the accompanying drawings in which.

DETAILED DESCRIPTION OF THE INVENTION

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

Figure 1:
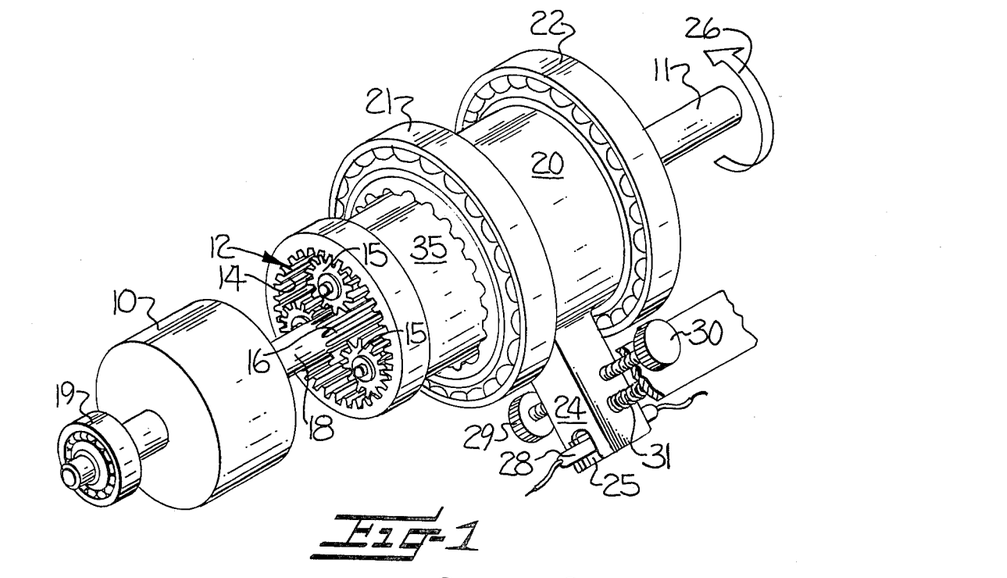
FIG. 1 is a perspective view of one form of sensor responsive to the rate of change of changing rotational speeds of a rotatable element, in accordance with the present invention.

Referring now more particularly to the accompanying drawings, FIG. 1 shows a sensor for responding to the rate of change of changing rotational speeds of a rotating member such as a vehicle wheel. The sensor of FIG. 1 includes a flyweight 10 coupleable for rotation in response to wheel rotation by means of a shaft 11. The flyweight 10 and shaft 11 are coupleable through means including a planetary gearing generally indicated at 12 and having an orbit gear 14, planet gear 15, and a sun gear 16. The sun gear 16 is formed integrally with an interconnecting shaft 18 to which the flyweight 10 is fixed and which is supported for rotation by a suitable bearing 19. The flyweight 10 and the input shaft 11 are arranged so as to permit relative rotation therebetween, in a manner broadly similar to the prior sensors referred to briefly hereinabove such as those of U.S. Pat. No. 4,061,212 which is hereby incorporated by reference to any extent necessary to a full understanding of this invention.

Figure 2:
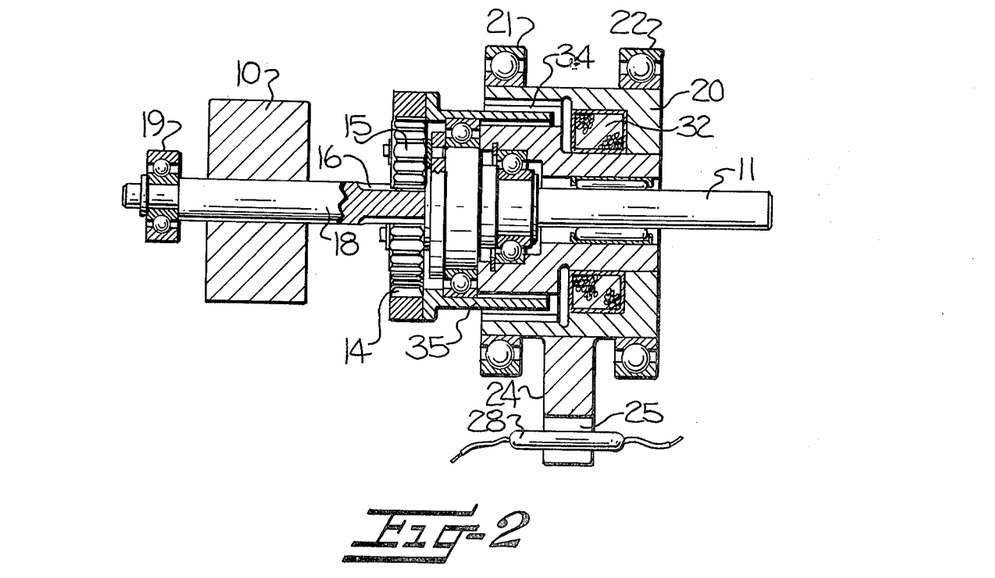
FIG. 2 is an elevation view, partly in section, of the sensor of FIG. 1.

More particularly, a stator 20 encircles the input shaft 11 and is mounted, by appropriate bearings 21, 22, for movement through a restricted arc. A projection 24 extending from the stator mounts a pair of counteracting permanent magnets, one of which is visible as a magnet 25, which are positioned to either side of a reed switch 28. The position of the magnets relative to the reed switch 28 controls the opening and closing of the contacts of the reed switch. The extent of arcuate movement of the stator is controlled by a pair of limit screws 29, 30 arranged to engage opposite sides of the projecting magnet carrier, while a setting spring 31 biases the stator toward one particular rotative position (opposite the driving direction of the input shaft 11 indicated by the arrow 26 in FIG. 1).

Mounted within the stator is an electromagnetic coil or winding 32 which serves to apply a magnetic field across a right circular cylindrical groove or gap 34 in the stator 20 and into which a cooperating coupling rotor member 35 projects from the orbit gear 14 of the planetary arrangement 12. As so arranged, the stator 20, winding 32 and rotor 35 cooperate to function as a control means for the level of torque transmitted from the input shaft 11 through the planetary 12 to the flyweight 10. The specific form of arrangement illustrated in FIGS. 1 and 2, and now described, exerts a selected plurality of levels of torque, preferably two, through a non-contact type coupling.

Certain of the sensors proposed heretofore and briefly referred to above use yieldable coupling means for achieving an operation in accordance with a particular sequence of events by which a flyweight is decoupled and the rate of deceleration of the decoupled flyweight is controlled. It is recognized that the word "coupling" has been used for mechanical devices operating in such a manner that relative movement is possible between different members so that connection and disconnection of the members relative to each other is possible. The word "brake" is generally used for devices giving a retarding effect upon other members. Certain classes of devices, which have been used in certain of the prior sensors briefly referred to above, function both as couplings and as brakes and the present invention (as described more fully hereinafter) contemplates the use of a wide range of various devices. By way of example and not by way of limitation, such devices may include contact devices such as helically wound wires or bands having one or more turns and electromagnetically operated frictional clutches. Such devices may also include non-contact devices such as eddy current couplings, magnetic powder couplings, magnetic hysteresis couplings, viscous couplings of various types, and dynamoelectric devices.

While the range of devices described above are useful in sensors in accordance with the present invention, those capable of giving a rapid and distinct connection and disconnection when an electrical current is applied and removed may be preferred for certain configurations as described hereinafter. Devices having those characteristics include, among others, magnetic hysteresis and magnetic powder couplings which have the additional advantage of exerting a desired total torque without the necessity that portions of the coupling move relative to one another. While at least some of the other above-mentioned types of devices may appear simpler and less expensive, such other devices frequently require that at least a certain relative turning movement occur between portions of the coupling in order for a torque to be exerted, giving rise to discernible differences for the values at which the sensors produce signals. Such differences will be found acceptable for certain applications of sensors in accordance with the present invention, and found unacceptable for others.

With sensors of the type to which the present invention relates, signaling occurs in response to certain g-value settings. The so-called g-value of a sensor as related to its use in brake control systems for vehicles is defined with reference to the vehicle speed change which causes an alteration of the rotational speed of a flyweight. Broadly stated, the relationship is $v = r \cdot \omega$, wherein v is the vehicle speed, r is the wheel radius and $\omega$ is the angular speed for the vehicle wheel. Additionally, the average figure for the acceleration of objects in the gravitational field of the earth, namely 9.81 m/sec$^2$, is used as a reference. High retardation values thus give high g-values, with low retardation values giving low g-values. Normal g-value settings for sensors included in vehicle brake control systems are between 0.7 and 1.5 g. The disclosure here of couplings of magnetic powder and magnetic hysteresis types reflect the ability of such couplings to operate within such normal ranges, but it is further contemplated that many other couplings may operate within such ranges, including those types briefly described hereinabove.

For purposes of clarity and in order to assure full understanding of the non-contact couplings particularly disclosed, it is appropriate to briefly describe the functional characteristics and features of magnetic powder and magnetic hysteresis couplings. As indicated briefly hereinabove, such devices may have a stator and a rotor. The stator may comprise a rotationally symmetrical member of iron having an inner cylindrical coupling surface. The rotor may also be formed, at least in part, by a rotationally symmetrical iron member rotatably mounted relative to the stator and having an outer cylindrical coupling surface which turns with a relatively small gap or spacing with regard to the coupling surface of the stator. A solenoid or electrical winding is arranged so that the stator and rotor provide opposite poles, such as where the stator provides a south pole and the rotor a north pole. The gap between the stator and the rotor may be filled by magnetic particles or powder (if so desired) in which case the device is of a magnetic powder type. Under the influence of the magnetic field in the gap between the rotor and stator, such magnetic powder will coalesce and resist relative turning motion between the rotor and the stator, with the magnitude of the resistance being dependent upon the dimensions and proportions of the coupling device and the quantity of magnetic powder employed. For any certain coupling, the magnitude of the resistance to turning movement is directly proportional to field strength, that is to the current applied to the electrical winding or solenoid. The torque is essentially independent of rotational speed. A magnetic powder coupling can provide large torques from a coupling of relatively small size and with low current consumption, but suffers from a possible deficiency in that the coupling is subject to wear and deterioration of the magnetic powder.

In a hysteresis coupling, the rotor is generally provided by a drum or flat disc of magnetizable material. Such couplings are broadly known and, in at least certain forms, are available from manufacturers known to persons skilled in the art. In a coupling of the magnetic hysteresis drum type, the drum may have only one end wall, to which a shaft is mounted concentrically with an outer surface of the drum. A stator may be provided by an outer and an inner part, each concentric with the rotor shaft and drum. A central opening through the inner part of the stator may receive the shaft of the drum and accommodate bearings for the shaft. Longitudinal grooves are formed in the inner surface of the outer stator part and in the outer surface of the inner stator part, with the stator parts being so mounted that the grooves are displaced by half a pitch relative to each other. The material between the grooves thus provides a plurality of elongate pole pieces extending generally in the direction of the mounting shaft. The winding is so arranged that one of the stator parts functions as one magnetic pole and the other functions as the opposite magnetic pole, positioning the rotor between two magnetic fields in such a way that the material of the rotor is magnetized in a particular pattern and, during relative movement, the pattern of magnetization must be displaced in the mass of the rotor. Such continuous change in a magnetic field causes a loss, referred to as "hysteresis loss", which results in the exertion of a torque.

In the couplings described, the torque exerted is independent of rotational speed and will have the same magnitude at standstill or at any rotational speed. Losses in addition to air resistance and bearing losses, which are so small in couplings of the size with which the present invention is concerned as to be neglectable, essentially amount only to an unavoidable eddy current loss. Suitable structural design for such a coupling as a total unit and material choice for the components may maintain any non-linear part of the total torque exerted below one percent of total torque. Generally speaking, torque is proportional to stator magnetization, i.e. directly proportional to current intensity.

In accordance with this invention, it is preferred that both magnetic powder and magnetic hysteresis couplings be supplied with electrical current through a temperature compensated constant current circuit in order that the torque exerted may be maintained at controlled levels notwithstanding varying temperatures of the winding, as the resistance of the windings may vary in connection with such varying temperatures. A constant current circuit may also be necessitated by the current supply, such as an automotive vehicle electrical system, not being able to maintain a constant voltage.

Figure 3:
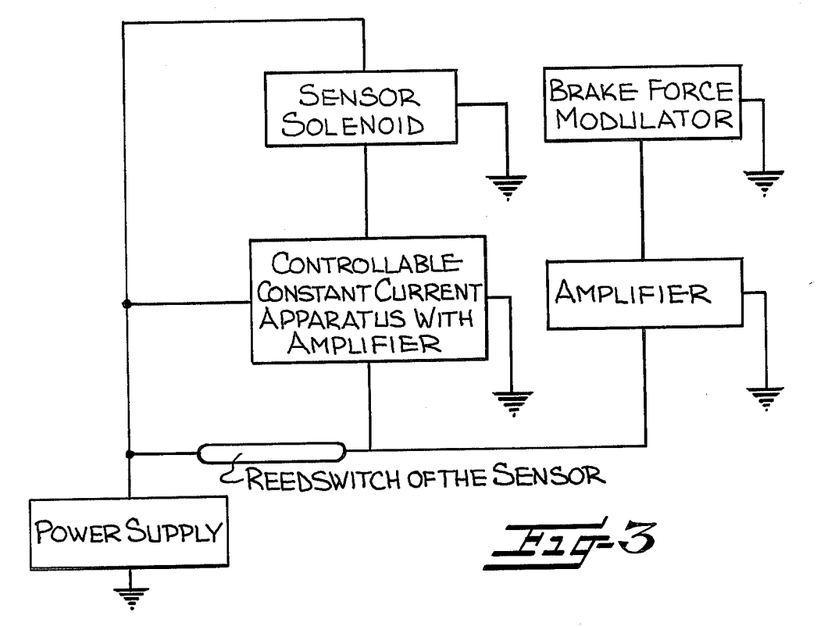
FIG. 3 is a schematic diagram of electrical circuit elements as used with certain sensors in accordance with this invention.

In operation of the sensor of FIGS. 1 and 2, while the input shaft 11 and flyweight 10 are stationary, the spring 31 acting against the projecting magnet carrier 24 will maintain the magnet carrier against one setting screw 29, with the permanent magnets being so positioned relative to the reed switch 28 that the reed switch is maintained open. Thus, a controllable constant current circuit (FIG. 3) is caused to supply the winding 32 with electrical current. Any turning movement of the input shaft 11 is then transmitted through the planetary gearing 12 to the interconnecting shaft 18 and thence to the flyweight 10. In the event that the input shaft 11 is subjected to a rate of retardation which is greater than a threshold rate which, according to the mechanics of the sensor, corresponds to the turning moment from the spring 31 and the common inertia of the flyweight 10, the interconnecting shaft 18 and the co-rotating parts of the bearings connected thereto, the tension of the spring 31 is overcome and the projecting magnet carrier 24 and stator 20 will turn to engage the other setting screw 30. The permanent magnets are thus moved to such a position that the reed switch 28 is closed, in which event the current supplied to the winding 32 is switched to a controlled substantially lower current resulting in a lower torque being exerted by the coupling. At the same time, electrical current is supplied to a brake modulator.

Figure 4:
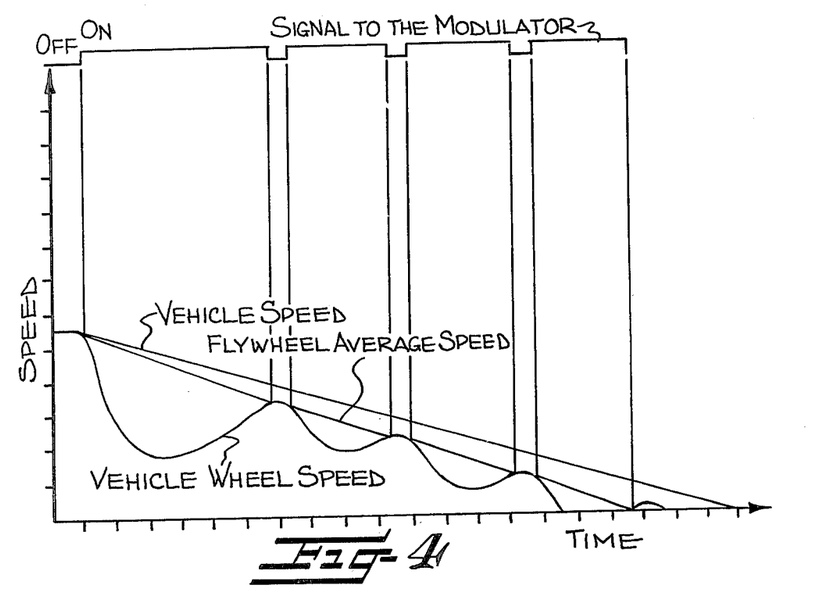
FIG. 4 is a diagram illustrating the course of events during deceleration of the rotational speed of a rotatable element and reflecting the operation of sensors such as that of FIGS. 1 and 2.

An illustration of the function of a sensor according to the present invention is given in FIG. 4 where, after braking is begun, vehicle wheel speed dips while vehicle speed decreases at some lesser deceleration rate. The average speed of a flyweight of a sensor lies between vehicle speed and vehicle wheel speed. The uppermost line in FIG. 4 illustrates the transmittal of a signal from the sensor in accordance with the present invention to a brake modulator circuit, showing that the signal to the modulator is on continuously during intervals of time that vehicle wheel speed is below the speed of the flyweight.

The curves representing vehicle speed, speed of a flyweight, and vehicle wheel speed in FIG. 4 may also be used in order to clarify the meaning of the term "g-value". More particularly, the slope of the line indicating vehicle speed, or the negative derivative thereof, is a measure of the retardation of the vehicle expressed in appropriate units such as m/sec$^2$. The alternating positive and negative slopes or derivatives of the wheel speed line are indicative of momentary retardations and accelerations of the wheel expressed, for example, in radians/sec$^2$. Similarly, the somewhat jagged speed curve for the sensor flyweight is indicative of momentary retardation and acceleration. Operational characteristics such as those shown in FIG. 4 may be achieved by an appropriate selection of the relative slopes involved.

In accordance with important characteristics of the present invention, the torque exerted by the coupling is, at the normal high current intensity through the winding 32, substantially higher than the torque at the lower controlled current intensity. That is, the slope of the portions of the line representing the speed of the flyweight in FIG. 4 and having a negative slope indicates that the flyweight is, for those portions of its operation, braked by the coupling supplied with a controlled low intensity current. Those portions of the flyweight speed representing line having a positive slope correspond to circumstances in which the flyweight is being accelerated while the coupling is supplied with the controlled higher intensity current. It is to be noted that the moment exerted by the spring 31 is to be higher than the moment exerted between the rotor member 35 and the stator 20 when the coupling is being subjected to the controlled lower intensity current.

Figure 5:
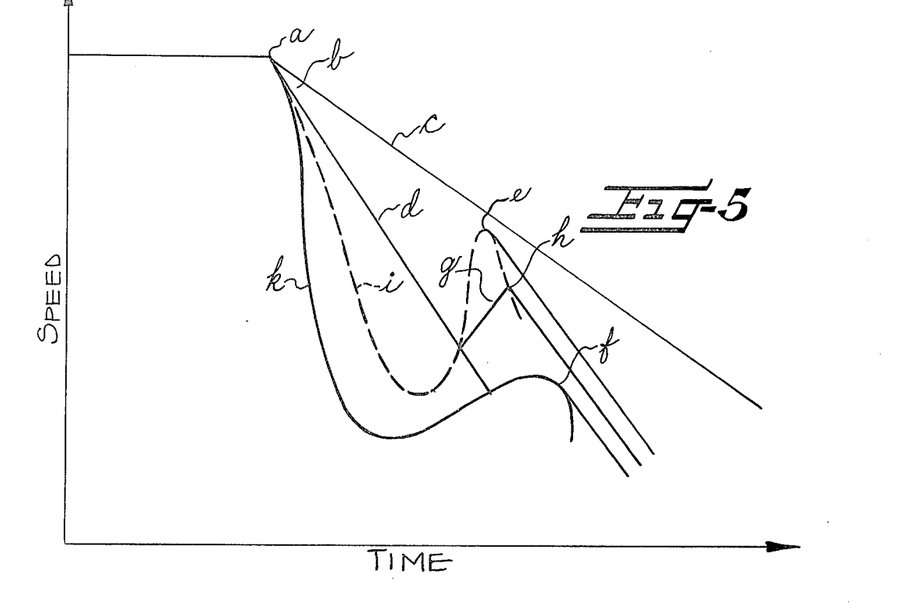
FIG. 5 is an enlargement of a portion of the diagram of FIG. 4.

FIG. 5 is an enlarged illustration of a portion of certain of the curves of FIG. 4, further illustrating a manner in which the sensor of the present invention is accommodated to vehicle wheel friction conditions influential on vehicle braking. In connection with the following description of events there illustrated and other points in the present description, the expression "slip" has been and will be used. "Slip" is understood by persons working in the applicable arts as representing a difference between vehicle speed and any corresponding peripheral speed of a vehicle wheel, divided by vehicle speed. Such a number is multiplied generally by a factor of 100 and expressed in a percentage. Extensive tests have shown that slip values or slip percentages for maximum braking effect should be in the range of 15 to 25 percent, depending upon existing road conditions.

Referring now to FIG. 5, the velocities of a wheel and vehicle will frequently appear, immediately before braking is begun, substantially constant and in direct relationship one to the other (that is, with 0 percentage slip). Such a condition is indicated by single straight, generally horizontal line to the left of point a in FIG. 5. Upon initiation of braking effort applied to a wheel, wheel speed dips (toward progressively greater slip percentages) while vehicle speed decreases at some lower deceleration rate. As indicated in FIG. 5, a divergence appears between the speed of the decelerating vehicle as indicated along the line c and the speed of a braked wheel indicated by two curves, namely a broken line curve i for a good road surface condition such as dry asphalt or concrete and a full line curve k representing a bad road condition such as wet ice. As will be appreciated, acceleration of the vehicle wheel during modulated braking over a good road surface (the broken line curve i) is characterized by relatively reasonable retardation and acceleration at a relatively high rate. A braking sequence over bad road conditions (the full line curve k) is characterized by sudden retardation of the braked wheel and poor re-acceleration.

Where the "normal" higher intensity current applied to the sensor winding is selected to be very high, the coupling will accelerate the flyweight so rapidly that it follows vehicle wheel speed as soon as vehicle wheel speed reaches the speed of the flyweight. Thus, under good road surface conditions, the sensor begins signalling for brake modulation at a point e from which vehicle wheel speed again retards. Under bad road surface conditions (on the full line curve k), sensor signalling begins at a point f at which wheel slip differs significantly from the wheel slip under comparable good road surface conditions (at point e). Thus, the vehicle wheel will be braked with a higher slip under bad road surface conditions than with good road surface conditions, which is undesirable. By controlling the higher level of current supplied to the winding of the sensor, the torque transmitted through the coupling is restricted so that the flyweight of the sensor does not directly follow the speed of the vehicle wheel, but will instead be accelerated along a different line such as is indicated by a straight line g in FIG. 5. For simplicity, the slope or g-value of the thus controlled acceleration has been chosen in such a way that the sensor will begin to signal at the same point f under bad road conditions, while signalling under good road conditions does not occur at the point e, as previously was the case, but at a different point h. As a result, the vehicle wheel is braked with a slip value which does not differ greatly between good and bad road conditions. In this operation, the acceleration of the decoupled rotating flyweight is limited to a rate less than a controlled, substantially constant rate.

It is to be noted that most of the brake force modulators currently employed are provided with devices delaying the reapplication of braking force after cessation of the signal from a sensor. Such a delay is a parameter that can be used in combination with controlling the current levels applied to a coupling device in accordance with the present invention to obtain "feedback" of information to the sensor regarding existing road conditions. It is anticipated that this particularly simple and attractive form of "feedback" will be entirely sufficient for road vehicles not expected to be used on roads having greatly varying frictional conditions and for vehicles running upon rails.

Figure 6:
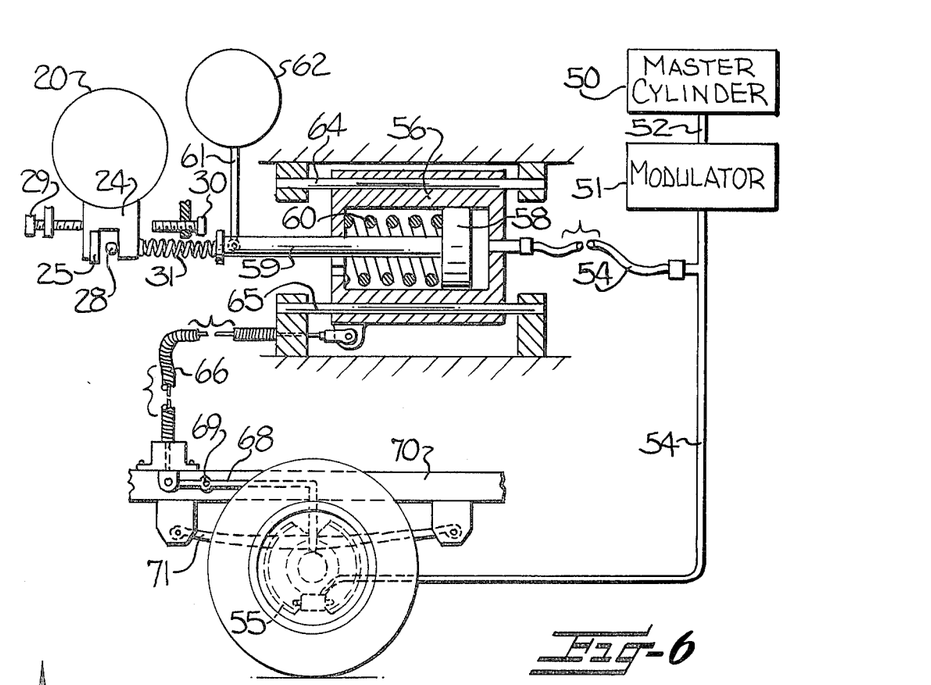
FIG. 6 is a schematic view, partly in elevation and partly in section, of an arrangement by which the parameters of operation of the sensor of FIGS. 1 and 2 may be accommodated to vehicle operating conditions.

Frictional conditions existing between a wheel and a road surface are one of two important varying factors which, in accordance with the present invention, may have influence on the g-value settings of sensors for a particular vehicle. The second factor is vehicle loading, and FIG. 6 illustrates an arrangement in which the two variables can affect the adjustment of a sensor. More particularly, FIG. 6 includes a schematic representation of a source 50 of a pressurized braking fluid, such as a master cylinder supplying pressurized hydraulic oil, and a brake force modulator 51 for controlling vehicle wheel braking. An appropriate conduit 52 connects the pressure source 50 with the modulator 51 and a further conduit 54 supplies pressurized braking fluid to a vehicle wheel brake 55. Pressure supplied from the master cylinder 50, whether or not modulated or reduced by the effect of the modulator 51, is supplied through the conduit 52 to a cylinder 56 enclosing a piston 58 which operates a piston rod 59 and is acted on by a return spring 60. The position of the rod 59 controls the position of one end of the setting spring 31, and thus the g-value setting of the sensor. Additionally, the position of the rod 59 may act, through a pin 61, on an electrical circuit element of the controllable constant current apparatus which may, for example, be a potentiometer 62. The cylinder 56 is arranged to slide axially along two guides 64, 65. Further, the cylinder 56 is operatively connected with a Bowden wire 66, the other end of which is connected to a lever 68 mounted for movement about a pivot 69, fixed in the frame 70 of the vehicle, in response to relative displacement of a portion of the vehicle frame 70 and the vehicle suspension 71. As vehicle load increases, the vehicle suspension moves relative to the frame, causing movement to be transmitted through the lever 68 and Bowden wire 66 to the cylinder 56.

When the brakes are not actuated and no pressure is transmitted from the master cylinder 50 through the modulator 51 to the brake cylinder 55 of the vehicle wheel and the control cylinder 56, the return spring 60 urges the piston 58 to the right in FIG. 6, with the piston rod 59 thus keeping one end of the setting spring 31 in a position for a low g-value setting and the potentiometer 62 at a position at which low current intensity is applied to the winding 32. When the master cylinder 50 is actuated, braking fluid pressure rises in the cylinder 56, the force thus applied to the piston 58 overcomes the force of the return spring 60, and the piston 58 and rod 59 are moved (to the left of FIG. 6). As a consequence, the force exerted by the setting spring 31 is increased and the pin 61 of the potentiometer 62 is turned in such a way as to raise the g-value settings of the sensor.

At an increased brake fluid pressure a point may be reached at which the vehicle wheel tends to lock and the sensor generates a signal to the modulator to lower brake pressure. The brake pressure at which the sensor starts to signal is a measure of the frictional conditions existing between the wheel and the road surface and the system, as here described, has thus adjusted the sensor to a g-value setting suitable for the existing conditions.

Compensation of g-value settings solely in response to braking fluid pressures will be found, in some circumstances, to be sufficient for vehicles such as heavy passenger cars in which wheel pressure does not vary greatly in response to vehicle loading. However, with cargo trucks and small cars of relatively low weight, wheel pressures may vary considerably in response to vehicle load. It is with such vehicles that the efficiency and versatility of a brake control system is substantially enhanced by using both vehicle load conditions and hydraulic braking fluid pressures as control parameters for g-value settings. In such instances and in the arrangement illustrated in FIG. 6, it is correct to say that the load dependent g-value adjustment is superposed on the fluid pressure dependent g-value adjustment.

Brake force modulating systems have been proposed for compressed air brake systems in which air pressure is not modulated but a hydraulic system is provided to oppose or counteract the brake force exerted by the "normal" compressed air brake system. The present invention is contemplated as being adaptable to such arrangements, with it being understood that in such arrangements the cylinder 56, piston 58, piston rod 59, and return spring 60 may be replaced by a differential pressure cylinder arrangement in which the piston is balanced between the total air pressure applied to a wheel cylinder and the counteracting hydraulic fluid pressure. In the event that the pressure ranges for the air and hydraulic fluid are of different magnitudes, the cylinder arrangement may employ two interconnected pistons of different diameters in order to accommodate the balancing effect. Normally, the "counteracting" hydraulic fluid pressure would be contemplated as being higher than the "normal" air brake pressure and, for that reason, the piston responding to air brake pressure may be the larger one.

Figure 7:
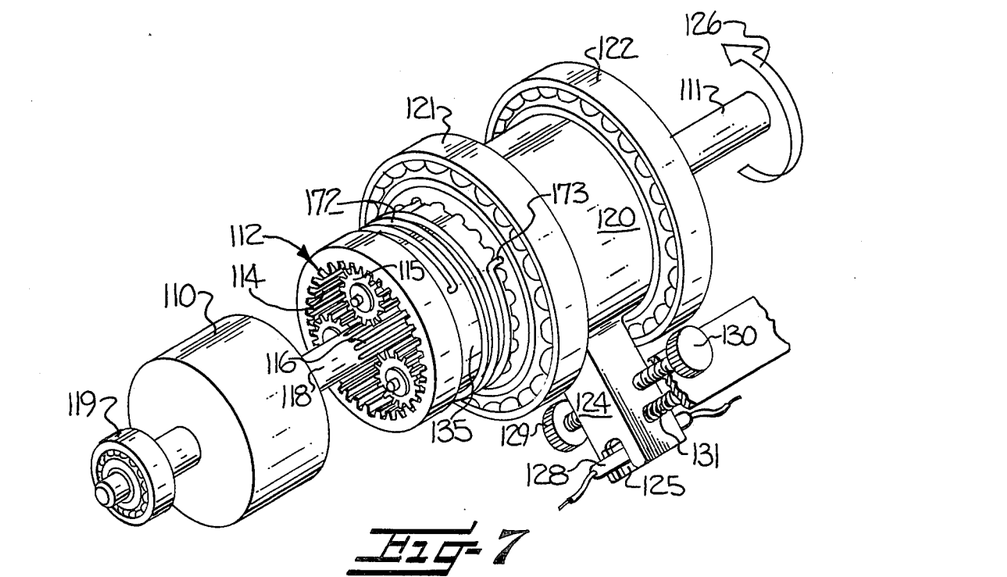
FIG. 7 is a view similar to FIG. 1, showing a second form of sensor in accordance with the present invention.
Figure 8:
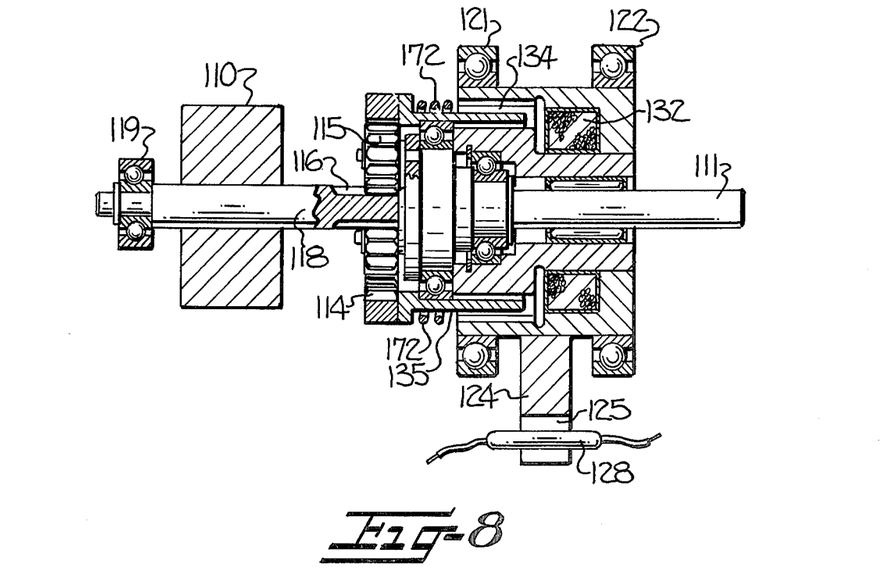
FIG. 8 is a view similar to FIG. 2, of the sensor of FIG. 7.

In the sensor of the present invention as described to this point, the two levels of torque transmitted through the coupling are determined by two levels of current applied, inasmuch as the coupling employed is of a non-contact type. It is contemplated, however, that the coupling employed may at least include a contact type element by which at least one of the levels of torque transmitted is determined. Such an arrangement is illustrated in FIGS. 7 and 8, where components comparable to those described to this point are identified by similar reference characters of a 100 series. Inasmuch as there is substantial similarity between the sensor of FIGS. 7 and 8 and that of FIGS. 1 and 2, the present discussion will be directed particularly to the distinctions and differences therebetween.

More particularly, the coupling of FIGS. 7 and 8 includes a contact type element in the form of a helical coil or spring 172. In a manner similar to certain arrangements disclosed more fully in U.S. Pat. No. 4,061,212, one end 173 of the coil 172 is fixed in the stator 120, while the other end is free relative to the rotor member 135 which it encircles. Torques accelerating the flyweight and exceeding that which can be transmitted through the non-contact coupling are transmitted through the freewheel arrangement thus provided by the contact type coupling provided by the coil 172. It should be noted that a great number of different freewheel devices such as roller and sprag clutches are known and can be used. The coil is preferred because of its extreme simplicity and low cost. In similarity to the operation described above with particular reference to FIG. 5, where the driving torque of the helical coil 172 is selected to be very high, the coupling will accelerate the flyweight so rapidly that it will follow vehicle wheel speed as soon as it reaches the speed of the flyweight. By restricting the driving torque which can be transmitted through the helical coil 172 (in a manner known to designers of such devices), it is possible to control operation in a manner similar to that described above with reference to the selection of current levels applied. Thus, operation as described above may be accomplished by a combination of non-contact and contact type couplings.

In the drawings and specification, there has been set forth a preferred embodiment of the invention, and although specific terms are employed, they are used in a generic and descriptive sense only and not for purposes of limitation.

That which is claimed is:

1. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said control means comprising means for controlling the level of torque transmitted by said control means and operable in response to an occurrence of a rate exceeding the threshold rate for changing the level of torque from a first level to a second level and thereby for causing said signalling means to signal continuously for the interval of time during which the threshold rate is exceeded.

2. A sensor according to claim 1 wherein said control means comprises a non-contact coupling device.

3. A sensor according to claim 1 wherein said control means comprises an electrically controllable coupling device and further wherein said means for controlling the level of torque transmitted comprises electrical circuit means electrically connected to said coupling device and responsive to said signalling means for switching between first and second electrical currents corresponding respectively to said first and second levels of torque.

4. A sensor according to one of claims 2 and 3 wherein said coupling device is a magnetic hysteresis coupling.

5. A sensor according to one of claims 2 and 3 wherein said coupling device is a magnetic powder coupling.

6. A sensor according to claim 3 wherein said electrical circuit means comprises current regulating means for supplying to said coupling device regulated, substantially constant first and second currents.

7. A sensor according to one of claims 3 and 6 wherein said electrical circuit means comprises adjustable means for selectively varying the lower one of the first and second currents and thereby for selectively varying the threshold magnitude of torque selectively decoupling the flyweight and the g-value setting of the sensor.

8. A sensor according to claim 7 wherein said adjustable means comprises means for operatively responding to vehicle operating conditions by selectively varying said one current in accordance with variance in vehicle operating conditions.

9. A sensor according to claim 8 wherein said means responsive to vehicle operating conditions is responsive to brake fluid pressure.

10. A sensor according to claim 8 wherein said means responsive to vehicle operating conditions is responsive to vehicle load.

11. A sensor according to claim 8 wherein said means responsive to vehicle operating conditions is responsive to both brake fluid pressure and vehicle load.

12. A sensor according to claim 1 wherein said control means comprises a contact coupling device.

13. A sensor according to one of claims 2 and 12 wherein said coupling device limits the rate of acceleration of the decoupled rotating flyweight to not more than a controlled, substantially constant rate.

14. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means including an electrically controllable coupling device operatively connected with the flyweight for successively exerting on the flyweight torques resisting decoupled rotation of the flyweight and accelerating the decoupled rotating flyweight, and signalling means operatively connected with the control means and responsive to decoupled rotation of the flyweight for signalling occurrences of an excessive rate of change in changing rotational speeds of the wheel, an improvement in said control means comprising electrical circuit means electrically connected to said coupling device and responsive to said signalling means for selectively applying to said coupling device an electrical current effective for limiting the rate of acceleration of the decoupled rotating flyweight to a rate less than a controlled, substantially constant rate.

15. A sensor according to claim 14 wherein said coupling device is a magnetic hysteresis coupling.

16. A sensor according to claim 14 wherein said coupling device is a magnetic powder coupling.

17. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for successively exerting on the flyweight torques resisting decoupled rotation of the flyweight and accelerating the decoupled rotating flyweight, and signalling means operatively connected with the control means and responsive to decoupled rotation of the flyweight for signalling occurrences of an excessive rate of change in changing rotational speeds of the wheel, an improvement in said control means comprising a contact coupling device for limiting the rate of acceleration of the decoupled rotating flyweight to a rate less than a controlled, substantially constant rate.

18. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said control means comprising means for controlling the level of torque transmitted by said control means and operable in response to an occurrence of a rate exceeding the threshold rate for changing the level of torque from a first level to a second level and thereby for causing said signalling means to signal continuously for the interval of time during which the rotational speed of the vehicle wheel is above a corresponding rotational speed of the flyweight.

19. In a braking system for a vehicle wheel and having anti-lock control means; and sensor means for actuating the anti-lock means including a flyweight coupleable for rotation in response to wheel rotation, means operatively interconnecting the flyweight and the wheel for selectively decoupling the flyweight from the wheel upon a torque having a magnitude greater than a threshold magnitude being exerted therebetween due to a change in rotational speed of the wheel and control means for exerting on the flyweight a torque resisting decoupled rotation of the flyweight, the improvement in said control means comprising means for controllably exerting on the flyweight a first torque of a predetermined magnitude and a second torque of a lesser magnitude and operable in response to exertion of a torque between the flyweight and the wheel having a magnitude greater than the threshold magnitude for changing the torque controllably exerted on the flyweight from the first torque to the second torque.

20. A system according to claim 19 wherein said control means comprises a non-contact coupling device.

21. A system according to claim 19 wherein said control means comprises an electrically controllable coupling device and further wherein said means for changing the torque controllably exerted on the flyweight comprises electrical circuit means electrically connected to said coupling device and responsive to said exertion of a torque greater than the threshold magnitude for switching between first and second electrical currents corresponding respectively to said first and second torques.

22. A system according to one of claims 19 and 21 wherein said coupling device is a magnetic hysteresis coupling.

23. A system according to one of claims 19 and 21 wherein said coupling device is a magnetic powder coupling.

24. A system according to claim 21 wherein said electrical circuit means comprises current regulating means for supplying to said coupling device regulated, substantially constant first and second currents.

25. A system according to one of claims 21 and 24 wherein said electrical circuit means comprises adjustable means for selectively varying the lower one of the first and second currents and thereby for selectively varying the threshold magnitude of torque selectively decoupling the flyweight and the g-value setting of the sensor.

26. A system according to claim 25 wherein said adjustable means comprises means for operatively responding to vehicle operating conditions by selectively varying said one current in accordance with variance in vehicle operating conditions.

27. A system according to claim 26 wherein said means responsive to vehicle operating conditions is responsive to brake fluid pressure.

28. A system according to claim 26 wherein said means responsive to vehicle operating conditions is responsive to vehicle load.

29. A system according to claim 26 wherein said means responsive to vehicle operating condition is responsive to both brake fluid pressure and vehicle load.

30. A system according to claim 19 wherein said control means comprises a contact coupling device.

31. A system according to one of claims 20 and 30 wherein said coupling device limits the rate of acceleration of the decoupled rotating flyweight to not more than a controlled, substantially constant rate.

* * * * *

UNITED STATES PATENT AND TRADEMARK OFFICE
CERTIFICATE OF CORRECTION

PATENT NO. : 4,225,018
DATED : September 30, 1980
INVENTOR(S) : Folke I. Blomberg It is certified that error appears in the above-identified patent and that said Letters Patent are hereby corrected as shown below:

In the Abstract, line 5, after "the" delete the word "flywheel" and insert therefor -- flyweight --

Column 2, line 2, after "means" delete the word "and" and insert therefor -- are --

Signed and Sealed this

Second Day of June 1981

[SEAL]

Attest:

RENE D. TEGTMEYER

Attesting Officer     Acting Commissioner of Patents and Trademarks